United States Patent [19]
Jensen et al.

[11] 3,879,825
[45] Apr. 29, 1975

[54] TIRE BUFFING MACHINE BLADES

[75] Inventors: Wayne E. Jensen, Homewood;
Charles Keith Stanfield, Matteson, both of Ill.

[73] Assignee: B. & J. Manufacturing Company, Glenwood, Ill.

[22] Filed: May 20, 1974

[21] Appl. No.: 471,676

[52] U.S. Cl. ............................ 29/79; 29/567; 29/90
[51] Int. Cl. ..... B23d 71/00; B26d 1/00; B21c 37/30
[58] Field of Search ................ 29/78, 79, 90 R, 567

[56] References Cited
UNITED STATES PATENTS

| | | | |
|---|---|---|---|
| 3,082,506 | 3/1969 | Jensen | 29/79 |
| 3,351,997 | 11/1967 | Neilsen | 29/79 |
| 3,528,153 | 9/1970 | Walter | 29/79 |
| 3,618,187 | 11/1971 | Jensen | 29/78 |
| 3,747,177 | 7/1973 | Jensen | 29/78 |

*Primary Examiner*—Harrison L. Hinson
*Attorney, Agent, or Firm*—Johnson, Dienner, Emrich & Wagner

[57] ABSTRACT

Expendable blades for use in tire buffing machines are disclosed having teeth with an outer edge and outwardly diverging leading and trailing side edges which form sharp prongs with the outer tooth edge for deep attack into the tire carcass; these teeth also having secondary or fine cutting edges comprised by the converging side edges of a cut-out, e.g., circular, in the outer edge of said teeth and surface-finish or buffing edges comprising the trailing edge of notches or slots which interrupt the outer tooth edge between the cut-out and one or both sharp prongs of the leading and trailing tooth side edges.

39 Claims, 44 Drawing Figures

TIRE BUFFING MACHINE BLADES

This invention relates to buffing machines useful for removing the tread and sidewall shoulders of used tire carcasses, for example in their preparation for vulcanizing, recapping or retreading operations. More particularly the invention relates to the expendable blades which are mounted in the hubs of such machines to effect said removal.

In the past it has been common to secure tacks or other pronged members about the cylindrical surface of the hub of such machines and the old rubber tread was removed from the tire carcass by more slowly rotating the tire with its tread surface held against the thus equipped surface of the rapidly rotating hub, the teeth constituted by said tacks or pronged members acting to loosen, tear and grind off the used tread and adjoining shoulder to a required depth. Simultaneously, either the rotating hub or the support for the more slowly rotating tire carcass would be moved, one relative to the other, so as to impart a required shaped surface, after which new rubber was applied to the vulcanizing or recapping operation.

U.S. Pat. No. 2,703,446 issued Mar. 8, 1955 discloses such a machine in which the rotating hub comprises a pair of end plates provided with support pins extending therebetween on which are mounted arcuate blades provided with a saw tooth outer periphery, the blades being suitably spaced or separated by spacers similarly mounted on the pins. The tooth blades were presented edgewise to the periphery of the rasp hub and formed spaced rows of pointed teeth spiraling about the periphery to effect the rasp action. A feature of the construction over the earlier tack type rasps was that the blades could be conveniently removed and replaced as their teeth became worn or were broken. In U.S. Pat. No. 2,896,309, issued July 28, 1959, such blades are provided with teeth of essentially dove-tail shape, the teeth being usually set in transverse relation to the blade body. In U.S. Pat. No. 3,082,506 issued Mar. 26, 1963 as a continuation-in-part of U.S. Pat. No. 2,896,309, the two outer tooth edge of the dove-tail shaped teeth are disclosed as provided with an indent in the form of a radial slot, slit or notch which, when the two halves of the outer tooth edge are offset, provide in the trailing edge of the notch a second surface of shorter depth which works on the surface of the tire carcass immediately behind the cutting edge of the teeth as the rasp rotates. It was found that this second edge would effectively buff the cleared surface to a condition or texture which markedly increases the bond which can be effected between the carcass and the new rubber in the subsequent recapping and vulcanizing operation.

Commonly the teeth of such blades are arranged in the periphery of the hub so that they project radially therefrom, although in so-called disk hubs they may be in radially spaced rows and arranged to project axially of the hub.

In U.S. Pat. No. 3,618,187, issued Nov. 9, 1971, one row of blades have an inclined working edge containing teeth of generally dove-tail shape as disclosed in U.S. Pat. No. 2,896,309, but projecting at an angle preferably 90° with respect to the main body of the blade so that the teeth extend generally parallel to the axis about which the hub rotates. It has been found that a single row of such inclined teeth about the periphery of the hub is effective to remove the old rubber tread from the tire carcass in long strands or peels. Such were combined with trailing rows of blades having dove-tail shaped teeth such as disclosed in U.S. Pat. No. 3,082,506. The teeth of these blades when assembled on the same hub behind the row of peeling teeth effectively engage the peripheral surface of the tire immediately behind the peeling action of the cutting teeth to impart a fine buffed texture to the remaining peeled surface to which the new rubber effectively bonds or unites.

In accordance with this invention, we have found a new shape of tooth for tire buffing blades which is particularly effective whether the blades are to be mounted with their teeth disposed essentially radial with respect to the axis on which the hub rotates, parallel thereto or at some inclined angle therebetween, the new tooth shape providing advantages and features not previously obtainable.

In accordance with this invention, it is proposed to utilize dove-tail shaped teeth with leading and trailing side edges characterized by outwardly diverging edges which meet and form sharp prongs with the termini of the outer tooth edge. However, it is a feature of the invention that the size of these teeth and the spaces therebetween are increased beyond the dimensions previously commonly employed. Such larger dimensioned teeth are able to attack more deeply into the tire tread to remove the old tread in large chips. Such would be expected to leave a poorly textured surface. However, in accordance with this invention, secondary cutting surfaces are provided which work on the surface cleared by the primary cutting edges of the teeth. These secondary cutting edges are constituted by the outwardly converging side walls of a circular cut-out provided in the outer tooth edge between said primary side edges and major prongs formed thereby. These circular cut-outs have a smaller radius than that which defines the concave shape of the primary cutting edges of the teeth so that they cut more finely and less deeply into the tire carcass. Then to finish the finely cut surface to one to which the newly applied rubber will effectively bond, tertiary buffing surfaces are provided between each adjacent pair of secondary and primary cutting edges. In their preferred form, these tertiary buffing edges constitute the trailing edges of two inwardly convergingly related narrow slots or slits which extend to or slightly below the depth of the intermediate circular cut-out, the side edges of which constitute the secondary cutting edges. Advantageously, the portions of the tooth outer edge between the slots and circular cut-outs are offset so as to expose the buffing edges for effective performance.

In a modified form of the invention, the tertiary buffing edges may comprise the trailing edge of a half circle-shaped notch which may be at the same depth as, but preferably is at a lesser depth than the cut-outs forming the secondary or fine cutting edges. However, the aforementioned divergingly related narrow slots or slits are to be preferred because of the effective length and angle of the buffing edge which can be presented to the rubber tire carcass to produce the desired buffing or finishing action and without sacrifice of tooth strength. Because of the aforesaid converging relation of the two slots, the trailing edge of the first slot will have a positive rake, although considerably more blunted and so, usefully may have some small cutting action, whereas the trailing edge of the second slit being at a negative rake angle will have only a buffing action on the tire surface.

In the case of blades having their working edge on an angled or flanged portion which is inclined to the blade body, for example, so that the teeth are parallel to the axis on which the hub rotates, the offsetting of the portions of the outer tooth edge between the circular cut-out and slits in the outer tooth edge has been found effective to break up the otherwise long strands into short lengths as they are peeled from the tire carcass by the primary and secondary cutting tooth edges. The breaking up of the continuous strands is particularly effective when the said portions of the outer tooth edge betwen the cut-out and slits are offset to the same side of the teeth, in an essentially V-shaped relation or disposition, as when viewing the blade edgewise.

Thus an important feature of the invention is that the improved cutting and buffing action which results from the new tooth shape also works to advantage when incorporated in so-called "peeling blades" by reason that in addition to minimizing smoke and dirt production, the by-product or refuse is reduced to a size which can be easily handled by the air evacuating and/or collecting equipment commonly available to retreading shops.

A principal object of the present invention is to provide expendable blades for a tire buffing machine having teeth effectively spaced and of a shape as to be capable of cutting deeply into the tire carcass and at the same time reducing the remaining surface to a finish or a texture to which the subsequently applied rubber will effectively and strongly bond.

In the accomplishment of this object, the invention provides blades in which some or all of the teeth comprising the outer working edge thereof have both a deep cutting primary edge which removes rubber from the tire carcass in large chunks or chips, a secondary cutting edge which fine cuts, and a further edge or edges which buff or finish the tire carcass surface to a required texture.

Among the accompanying features of the invention are that said deeper cut finish of the tire carcass surface can be obtained with lowered torque requirements and reduced noise. At the same time, cutting speed can be increased very substantially.

It has also been found that strength and durability of the blade teeth is not sacrificed but that the useful life of the blades is lengthened. In experience to date, this has been on the order of 100 to 300 percent. This is due in part to the ease and speed with which the teeth are able to perform their cutting and surface finishing functions. It is also due to the capacity of the blades to perform their cutting and finishing function while avoiding the development of excessive heat and at low power consumption.

Other features of the invention are that the blades and teeth are so shaped that their outer edge is self-sharpening, and when worn the blades may be utilized in reverse, the original trailing edges of the teeth then becoming the leading edges to perform the cutting and finishing function and so further increase the life of the blades. The design and shape of the blade teeth is such that the several cutting and finishing edges have sufficient body as to provide resistance to tooth breakage. The design of the teeth is also such that the blades are practical and economical to manufacture.

Many other objects, advantages and features of the invention will be at once apparent or will become so from the more detailed description of preferred forms of the invention which now will be described in connection with the accompanying drawings.

Referring first to said drawings:

FIGS. 9A through 14A are geometric schemes of the settings for the outer edge of the blade teeth of blades illustrated in FIGS. 9 through 14;

FIG. 17 illustrates still another form of the invention;

FIG. 21 is an annulus;

FIG. 31 illustrates another form of blade according to this invention;

FIG. 32 is a longitudinal sectional view taken through said blade along line 32—32 of said FIG. 31;

FIGS. 33 and 34 are fragmented views of a hub showing blades of FIG. 31 assembled therewith; FIG. 33 being a sectional view taken along lines 33—33 of FIG. 34;

FIGS. 37 and 38 illustrate a hub construction in which blades of FIG. 35 are mounted; FIG. 37 being a sectional view through the hub and FIG. 38 being a fragmented plan view of the hub with the top hub plate removed and illustrates the arrangement of the blades.

Figure 1:
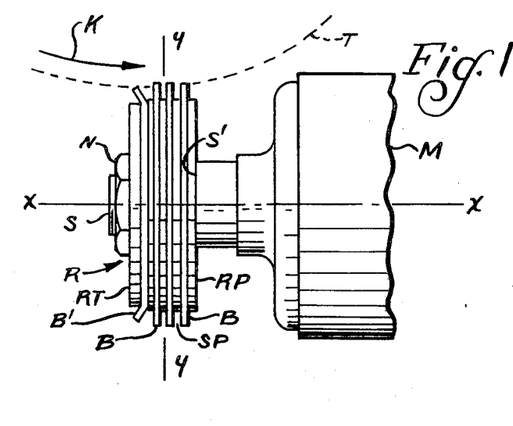
FIG. 1 is a side elevational view of one form of a tire buffing machine for which the blades of the present invention are adapted, the hub in which the blades are mounted being shown mounted upon a shaft of a motor with the position of the tire shown by phantom lines.

Referring more particularly to the several views wherein like parts are identified by like reference numerals, FIG. 1 illustrates apparatus commonly identified in the tire retreading industry as a tire buffing or detreading machine and is used to remove the old tread and/or adjacent shoulders from the carcass of a used tire T in preparing the same for a retreading or recapping operation as is well known. Such apparatus comprises a tire rasp or hub R embodying an outer or top plate RT and a rear or pin plate RP, both plates being centrally apertured to receive the reduced end of shaft S of a motor M. Both plates are generally of the same circular shape and size. Conventionally rear plate RP has fixed thereto axially directed pins P (FIG. 2) which as later described removably hold annular rows of blades B in spaced concentric relation about axis x—x of the hub R so as to expose their outer interrupted working edges beyond the periphery of the hub for attack on the outer periphery of tire T to remove the old tread therefrom.

Figure 3:
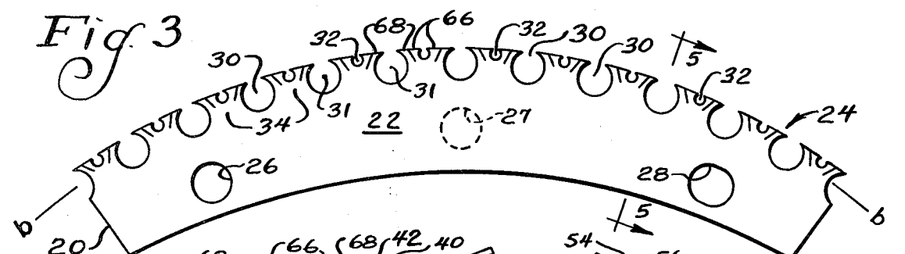
FIG. 3 is a plan view of a preferred embodiment of the blade comprising the present invention.
Figure 5:
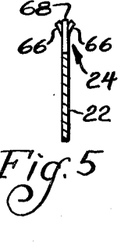
FIG. 5 is a sectional view taken through the blade along lines 5—5 of FIG. 3 looking in the direction indicated by the arrows.

As illustrated by FIG. 3, blades B according to one form of the invention are stamped or otherwise formed of sheet metal to a generally concavo-convex shape comprising a segment 20 of an annulus of a predetermined angular extent. In the illustrated example, said blades 20 each have an angular extent of near 72° wherefore five blades arranged end-to-end complete a full annular row or circle. Each said segments 20 comprise a main body 22 having generally flat parallel opposed surfaces, the outer or convex side of which embodies an interrupted working edge 24. Said working edge 24 as shown in FIG. 5 lies generally in the plane of the blade body 22. In alternate forms of the invention as afterwards described, the working edge of the blade may be inclined thereto. The body 22 of said blades is further provided with spaced openings 26, 28 disposed inwardly of its working edge 24 and providing means by which the blades or segments 20 are adapted for mounting on the mentioned pins P between plates RP and RT.

Figures 2, 13:
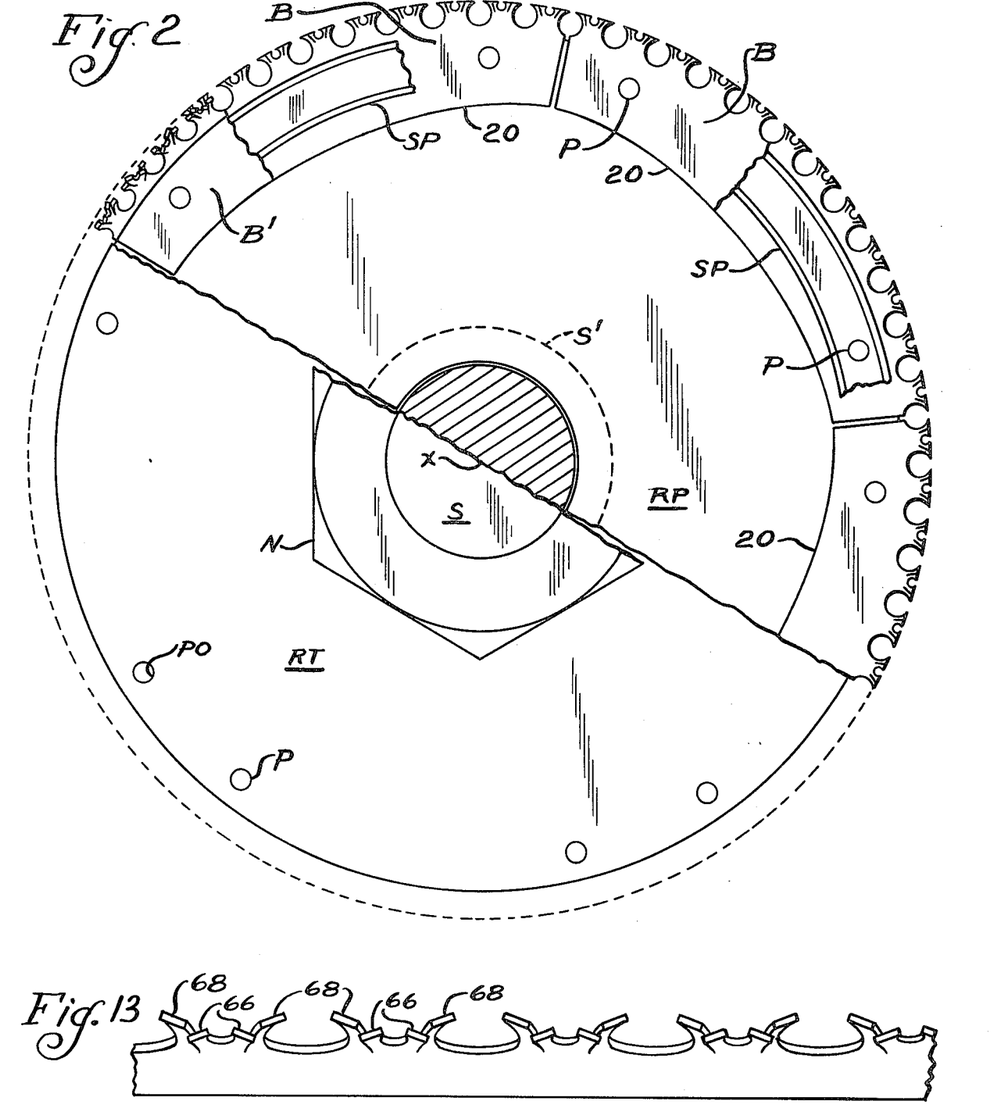
FIG. 2 is a plan view of the hub and blade assembly shown partly fragmented and in section.
FIGS. 9 through 14 illustrate alternate settings for the outer edge of the teeth of blades according to the invention.

Considering also FIG. 2, with FIG. 1, it will be understood that the axially extending pins P provided rear plate RP are in pairs or triplets corresponding in number to the number of blades making up an annular row and that top plate RT has similarly spaced complementary sized openings PO to receive the outer ends of said pins P. The center-to-center spacing of each said pairs or triplets of pins P and openings PO corresponds to the center-to-center spacing of openings 26 and 28 in the blades 20 or openings 26, 27 (in phantom) 28 when three pins P are employed. As shown, opening 26 is circular and of a diameter just large enough for a pin P to pass therethrough. Openings 27 and 28 may be of similar size and shape; preferably, however, opening 28 (and also opening 27 when used) is somewhat elongated in the direction of the arcuate extent of the blades to facilitate assembly of the blades over the pins. The smaller diameter of said oval shaped openings 28 (and 27) corresponds to the diameter of the circular opening 26, wherefore movement of the blades when properly mounted in the hub is inhibited.

Blades 20 are conventionally arranged in several rows as illustrated by FIG. 1, the blades of each row being separated from adjacent rows of blades by spacers Sp. Said spacers may comprise centrally apertured discs of appropriate thickness. They may comprise segments of an annulus and have a convexo-concave shape, an angular extent corresponding to that of the blades with which they are assembled and through-openings having a center-to-center spacing and diameter to receive pins P. In FIG. 1, the blades and spacers are shown arranged so as to define parallel rows of blades. However, the blades also may be differently arranged. For example, they may be arranged in discontinuous rows, or rows arranged in the form of a helix which spirals about axis x–x. Some users prefer that every other blade in a row be oppositely set at an angle to axis x—x to provide an oscillating effect when the hub is rotated. Where the blades are arranged in other than circular rows, the facing surfaces of the plate RP and RT have appropriately shaped surface sections and shoulders to achieve the desired relation. Such is well known in the art and for example described in U.S. Pat. No. 3,082,506. As is conventional, hub R and its assembled blades and spacers are mounted on the end of the arbor or shaft S of motor M as above described and held tightly against shoulder S' by means such as nut N so that the hub and its blades rotate with motor M about axis x—x thereof. T represents a tire carcass mounted on a conventional mount (not shown) for rotation about its axis as in the direction indicated by the arrow, suitable means (also not shown but of conventional construction) being utilized to move either of the mounts for the tire carcass or the hub and blade assembly toward and away from each other as in the direction indicated by plane y—y, to control the depth of cut or thickness of material removed by the exposed working edge of the blade from the tire carcass. Conventionally, the tire carcass is also motor-rotated but more slowly than is the rasp or hub R. Suitable means, as conventionally known, also are utilized to move one of said mounts relative to the other as through plane y—y in order that the action of the blade assembly on the tire carcass periphery may be extended in a required pattern or distance across the width of the tire tread and/or into the shoulder to reduce the tire periphery to a desired contour shape. As thus described, the construction and operation of a buffing or tread removing machine is conventional and well known to the art with which the invention is concerned.

In accordance with this invention the utility of a buffing or tire tread removing machine is considerably enhanced by utilizing a novel construction of working edge or teeth on the blades which are assembled in the machine hub, the construction of which working edge now will be described.

Figure 8:
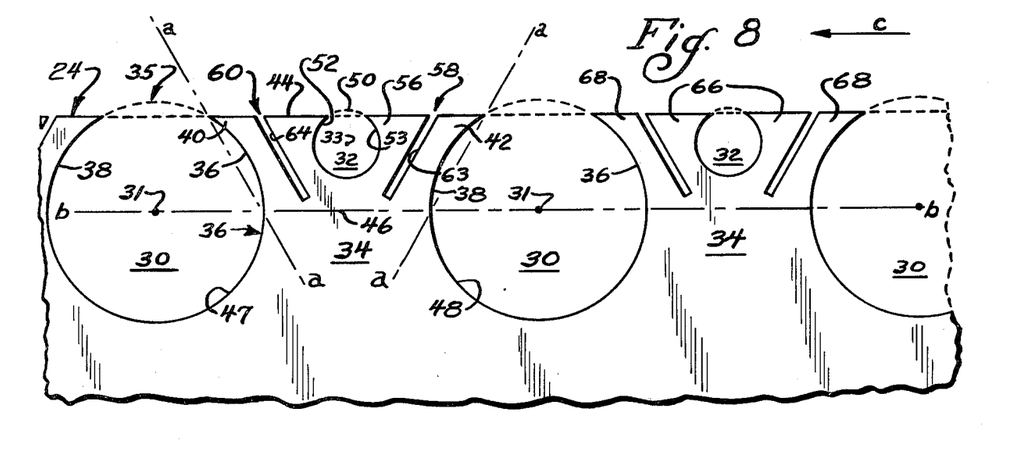
FIG. 8 is a greatly enlarged fragmented view of the working edge of a blade according to the invention and illustrates the preferred form shown in FIGS. 3 and 4.

As illustrated by FIG. 3, working edge 24 of the blade or segments 20 comprising the present invention is regularly interrupted by large or primary cut-outs 30 and smaller or secondary cut-outs 32 which are spaced intermediate or between each pair of primary cut-outs. Each said primary and secondary cut-outs in the illustrated embodiment are circular in shape and comprise a major arc, that is they have an angular extent of greater than 180° and preferably in the order of 300°. In the presently preferred form which is illustrated by FIG. 3, the primary cut-outs 30 are all of the same size, and their centers 31 are spaced along line b—b at a constant distance inwardly of the outer edge of the blade and at a regular distance apart equal to or approximating twice their diameter. Thus, as is illustrated in FIG. 8 comprising a section of the working edge of the FIG. 3 blade but on a larger scale, the primary cut-outs 30 divide the outer edge 24 of the blade into equidistantly spaced and similarly-dimensioned teeth 34. Each of these teeth are separated from adjoining teeth by a generally circular space 30 having a mouth 35, the angular extent of which is substantially less than the diameter of the separating spaces and which mouth preferably has an angular extent of near 60° or less. Each of these teeth 34 has a concave shape leading edge 36 defined by the arcuate shape of one of said primary cut-outs 30 and a similar but oppositely directed concave-shaped trailing edge 38 defined by the arcuate shape of the next succeeding primary cut-out 30. Above center line b—b on which centers 31 of the primary cut-outs 30 are located, the concave shape leading edge 36 and concave shaped trailing edge 38 of each tooth diverge outwardly through an angular extent of about 60° or roughly the angular extent of the mouth to said cut-outs or openings and thereby define acutely sharp hook ends or prongs 40 and 42 with the outer tooth edge 44 into which the outer edge 24 of the blade is thus defined by the primary cut-outs 30. As illustrated, each of said teeth 34 has a narrow waist 46 along center line b—b which approximates the diameter of the primary cut-outs 30. As illustrated in FIG. 8, the portions of the concave-shaped leading and trailing primary cutting edges 40 and 42 of the teeth which diverge outwardly from center line b—b have an angular extent approximately that of mouth 35 or ideally 60° and thus form acutely sharp hooked ends with the tooth outer edge 44, which by reason of their concave shape provides at their intersection with the outer tooth edge 44 an included angle considerably sharper than the 60° at which chord a—a across the angular extent of said primary cutting edge forms with said outer tooth edge 44. As illustrated by FIG. 8, said included angle is more in the order of 30°. Thus the hook shaped primary cutting edge 40 of each tooth 34 is capable of penetrating deeply into the material of the tire carcass to which it is brought and the similar angular extent of mouth 35 between said hooked shaped end and the preceding tooth provides sufficient space to create the large chips which said hook end is capable of severing from the periphery of the tire carcass. Below center line b—b, the leading and trailing sides 47, 48 of the teeth diverge inwardly of the blade along arcs of roughly 90°, thus providing the teeth 34 with a broad base which imparts strength and increases resistance of the teeth to breakage. The thus described oppositely directed concave shaped leading and trailing side edges of the teeth 34 impart thereto a characteristic hour glass shape.

The secondary cut-outs 32 which interrupt the tooth outer edge 44, preferably midway of the leading and trailing side edges of the teeth, similarly have their centers 33 spaced inwardly of the outer edge at a constant distance therefrom to provide a mouth 50 having an angular extent also near 60° and thereby have outwardly diverging leading and trailing side edges 52, 53 also of a similar angular extent. Said diverging leading and trailing side edges 52, 53 of the secondary cut-outs 32 therefore also define sharp hook ends at their intersection with the outer tooth edge 44 and at an included angle considerably sharper than 60° (and approaching 30°). As illustrated, the secondary cut-outs 32 have a diameter less than the diameter of the primary cut-outs 30 and such that the secondary cut-outs lie outwardly of the narrow waist 46 of the teeth and above center line b—b. In a presently preferred form of the invention, blades for an 11½ inch diameter hub or rasp R have a working edge comprising 11 full and two half primary cut-outs with their centers 31 equally spaced 6° apart. The blade thus has a total angular extent approaching that of 72°, and five blades complete a full circle. The primary cut-outs in this blade have a diameter of 5/16 inch and a center-to-center spacing of ⅝ inch; and the secondary cut-outs in the outer edge of the teeth between each pair of primary cut-outs have a diameter of 3/32 inch. Thus, in this illustrated embodiment of the invention the secondary cut-outs have a diameter equal to approximately 3/10ths the diameter of the primary cut-outs.

It will thus be apparent that the hooked shaped end 56 constituted by the trailing side 53 of the secondary cut-outs 32, considering the direction in which the blade is rotated (arrow c), like the leading hook end 40 of the teeth is similarly capable of sharply attacking the material of the tire tread. However, being shallower than the primary cut-outs, said hook shaped ends 56 take smaller chunks and serve to reduce the remaining cut surface of the tire carcass periphery to a more uniform texture. Thus, in accordance with this invention, the hook shaped end of the leading side edge of each tooth penetrate deeply into the tire carcass periphery and is therefore capable of removing tread material in large chips or chunks and the hook edge 56 of the secondary cut-outs follow to finish cut the surface to the shape required.

To further reduce the texture of the shaped surface of the tire carcass periphery to one to which the newly applied tread forming material will effectively bond, a buffed texture interrupt the outer tooth edge 44 on one or both sides of the is imparted by providing one or two tertiary surfaces, which interrupt the secondary cut-out 32. As illustrated in FIG. 8, these tertiary buffing edges comprise the trailing sides 64, 63 of a pair of narrow slots or slits 58, 60. These slots 58, 60 are preferably disposed in inwardly diverging relation and preferably parallel to the chords a—a, which define the angular extent of the leading and trailing primary cutting edges 40, 42 of each tooth to which they are adjacent. At least the trailing side edge 63, 64 of these slots and preferably both side edges of the two slots 58, 60 are straight and in parallel relation. As illustrated in FIG. 8 trailing edge 64 of slot 60 which is presented to the tire carcass surface with rotation of the hub is disposed at a positive rake angle of 60° to the outer tooth edge 44. Although said edge 64 thus parallels the chord a–a which defines the angular extent of the leading primary edge, it is considerably more blunt than either the primary (40) or secondary (56) cutting edges of the tooth. The second tertiary buffing edge 63, unlike the first tertiary edge 64 which is capable of some cutting function has a truly negative rake, being set at roughly 120° to the following section of the outer tooth edge 44. The trailing edges 63, 64 of both slots 58, 60 thus constitute tertiary or buffing edges which are effective to finish the tire carcass surface to a buffed texture but do not radically alter the shape of the tire carcass periphery to which it is rough cut by the leading primary edge of the tooth and the fine cutting edge of the secondary cut-out.

Since the major portion of the buffing action is provided by that portion of the tertiary edges 63, 64 which are immediately adjacent the intersection of said edges with the outer tooth edge 44, said slots 58, 60 advantageously will terminate short of center line b—b. For maximum tooth strength and minimal heating through friction contact, said slots 58, 60 are disposed to interrupt the tooth outer edge 44 substantially midway of the secondary cut-out mouth 50 and the adjacent one of the two primary cutting side edges 40 or 42. For the same purpose, said slots are also inclined generally parallel to the general disposition of said adjacent side edges 40 or 42 (illustrated by lines a—a) and wherefore the width of the blades and particularly those portions thereof which come into contact with the tire carcass during the cutting and buffing function of said edges are equally divided by the secondary cut-out 32 and slots 58, 60 on opposed sides thereof to comprise similarly sized and shaped areas 66. It will be understood that the length of said slots 58, 60 should therefore be long enough to accommodate twisting of portions of the outer tooth edge on either side of said secondary cut-out 32 in order to permit opening of an exposure of the tertiary buffing edges 63 and 64, as well as the leading cutting edge of the tooth at 40 and the secondary cutting edge 56. Ordinarily said slots may therefore terminate short of the waist 46 of the teeth.

Figure 4:
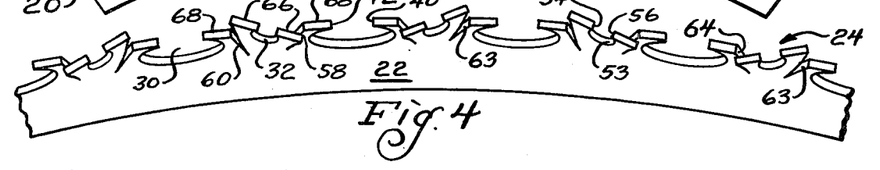
FIG. 4 is an edge view of the blade illustrated by FIG. 3 and shows one set of the teeth.
Figure 9:
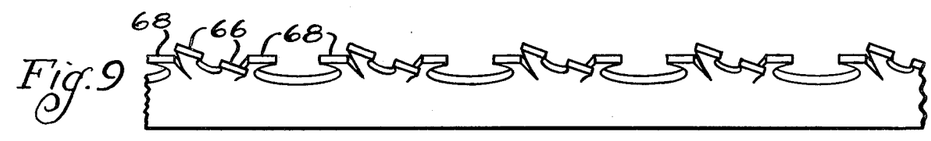
Figure 9A:
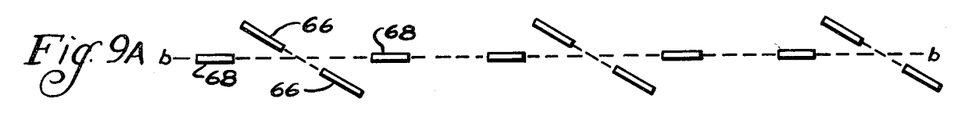
Figure 10:
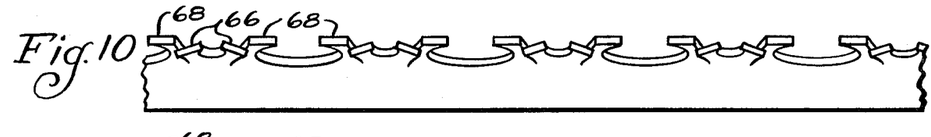
Figure 10A:
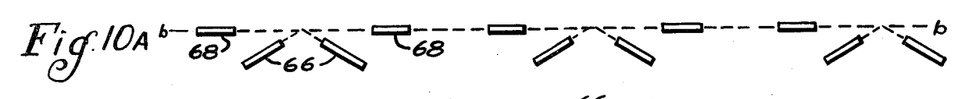
Figure 11:
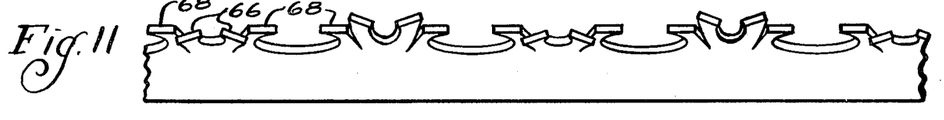
Figure 11A:
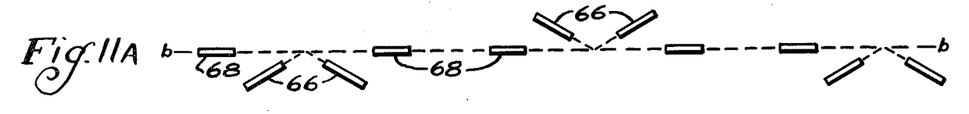
Figure 12:
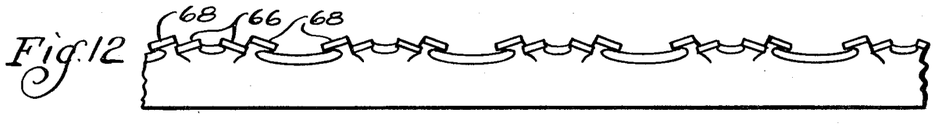
Figures 12A, 13A:
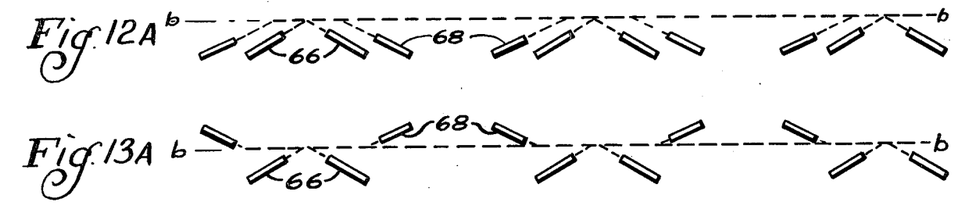
Figure 14:
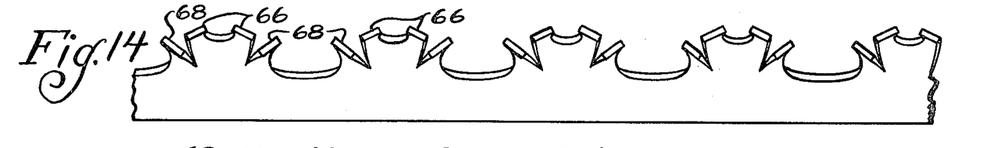

As illustrated by FIG. 4, considered with FIG. 3, portions 66, 66 of the outer tooth edge 44 defined between the interruption of the slots 58, 60 and the secondary cut-out 32 may be twisted or set transversely of the tooth plane so as to define a minor plane which is acutely angled less than 90° to the main plane of the teeth and the blade comprising said teeth. In this event portions 68 of the outer tooth edge 44 which lie between said slots 58, 60 and the adjacent primary side edges 36, 38 of the tooth, and therefore contain the hook end of said teeth, may be retained in the plane of the tooth or disposed at some different angle or in the opposite direction to the set of the outer tooth edge portions 66, 66. A reverse setting may also be utilized wherein portions 66 of the outer tooth edge 44 are retained in the plane of the tooth and portions 68 are set at some angle to said plane. The purpose of said setting as aforedescribed is to open up the primary and secondary cutting edges and also the two finishing or tertiary edges so as to facilitate and promote their attack on the tire carcass. FIG. 4 illustrates a particularly useful setting of the portions of the outer tooth edge 44 in which the edge portions 66, 66 of every other tooth define a minor plane angled to the minor plane comprising portion 66, 66 in the preceding and succeeding portions 68, 68 of each tooth being left in the general or major plane of the teeth. FIGS. 9 and 9A illustrates the outer tooth edge portions 66, 66 lying in transversely related parallel planes. FIGS. 10 and 10A illustrates said tooth edge portions 66, 66 being offset to the same side of the tooth and defining an essentially V-shape when looking edgewise of the blade. In FIG. 10 as seen best in FIG. 10A, said V-shape setting of edge portions 66, 66 are disposed all to the same side of the teeth, whereas in FIGS. 11 and 11A this setting is offset to the opposite side in every other tooth. In FIGS. 10A and 11A as in FIGS. 9 and 10, edge portions 68, 68 of all teeth lie in the general plane of the teeth; i.e., with no set. FIGS. 12 (and 12A) illustrates a setting similar to that of FIG. 10, but with the edge portions 68, 68 also offset to the same side of the teeth as are outer edge portions 66, 66 but at a smaller angle to the plane of the teeth. FIGS. 13 (and 13A) shows outer tooth edge portions 68, 68 set to the side of the teeth opposite to that to which outer edge portions 66, 66 are set but at a similar angle. FIG. 14 (and 14A) shows still another setting in which the outer tooth edge portions 66, 66 are set in converging relation to one side of the general plane of the teeth and the outer tooth edge portions 68, 68 are twisted across said plane and in a diverging relation. The angle at which said portions 66 or 68 are set may be varied within a considerable range, although in practice to date it has been found that a particular useful setting is in the order of 30° to 35° to the tooth plane.

Although to date best results have been obtained wherein two tertiary surfaces or edges have been utilized on opposite sides of the secondary cutting edge and set as aforedescribed, one of said slits 58, 60 may be omitted. Where one of the two tertiary edges is eliminated, the secondary cut-out 32 and the elected slit 58 or 60 may be respaced so as to uniformly divide the outer tooth edge 44.

Figures 14A, 17:
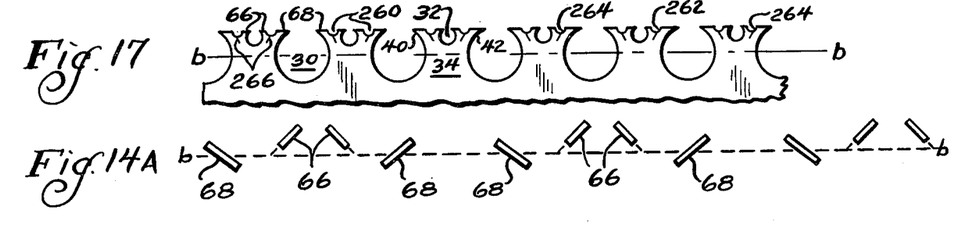

It is also preferable that at least the trailing edge of the slots represented at 63 and 64 be straight. However, because the said tertiary edges 63, 64 are opened or exposed to the tire by the set given the edge portions 66, 68 of the tooth outer edge, it is not necessary that the slots have any substantial width. However, under some circumstances, said edges of the slits, including their tire surface attacking edge 63, 64 may be slightly concave, as for example illustated in FIG. 15, Usually, said edges are not disposed radially because of the increased heat factor which has been noticed. As illustrated in FIG. 17, said slots 58, 60 may be half-circular shaped notches 260. In the presently preferred form of the invention, said half-circular shaped notches 260 interrupt the outer tooth edge 44 essentially midway between the secondary cut-out 32 and the adjacent one of the leading and trailing primary edges 36, 38 of the tooth. It will be appreciated, however, that said notches 260 are necessarily shallow (a depth approximating one-half their width. Therefore it may be necessary to interrupt the bottom edge of the notches by inwardly convergingly slits 266 in order to accommodate setting of either portions 66 or 68 of the tooth outer edge to open up their trailing edge 264 in order to perform its buffing function.

The aforedescribed circular shape afforded both the primary and the secondary cut-outs is the shape therefor of choice. Other shapes, however, may be utilized in accordance with the invention. For example, both the primary and secondary cut-outs 30, 32 may be given any one of several polygonal shapes, for example those illustrated in FIGS. 15 and 16. Characteristic of the teeth, however, is that the leading hook end of each tooth be set at a positive rake and at a sufficiently acute angle with respect to the outer tooth edge 44 as to effect the above described hook shape which facilitates penetration of said primary cutting edges 36 deeply and positively into the material of the tire tread to rough cut, and in the case of the secondary cutting edge 53 to finish cut the rough cut surface to shape. For this purpose, said primary and secondary leading edges will normally define an acute angle with the outer blade edge which is less than 60°. Either or both the secondary and primary cutting edges may therefore be circular within this limitation or either or both may be polygonal in shape. As illustrated in FIG. 16, the primary cutting edge 136 of the illustrated teeth is straight, although inclined to the outer tooth edge 44 to provide an included angle therewith of less than 60°. To avoid weakening the tooth, preferably the extent of said outwardly diverging side edges 136 and 138 does not continue below center line b—b is indicated by phantom lines 136a and 138a in FIG. 16. Rather, at said center line b—b said edges assume a more nearly radial disposition as indicated at 136b and 138b. A more satisfactory shape is indicated in FIG. 15 wherein said portions 136b and 138b of the primary edges of the teeth are disposed not radial but are in inwardly diverging relation so as to broaden the base of the teeth.

Figure 15:
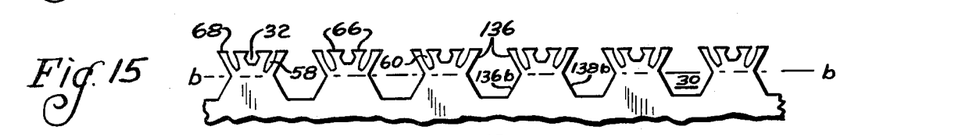
FIG. 15 is a fragmented view of the working edge of a second form of the invention.
Figure 16:
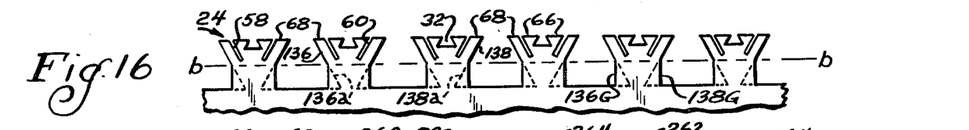
FIG. 16 is a fragmented view of another form of the invention showing a further tooth shape.
Figure 18:
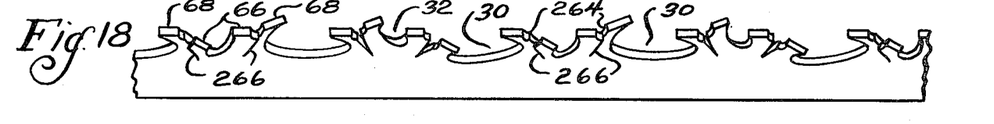
FIG. 18 is an end view of the blade illustrated by FIG. 17 and shows still another setting for the outer tooth edge.

Similar variations in the shape of the secondary cutout 32 may also be employed, some of which are illustrated in said FIGS. 15 and 16. It will be understood, of course, that the same ratio of size of the secondary cut-outs to the primary cut-outs is to be observed, as well as the relationship of the tertiary edge forming slots 58, 60. It will also be understood that the mouth of said cut-outs have an angular extent or width substantially smaller than the width of the primary cut-outs and may, for example, approximate the length of the inclined or outwardly diverging portions 136, 138 of the primary edges of the tooth as between the outer edge of the teeth and the center line indicated by b—b. Under some circumstances, it may be possible to further restrict the mouth of the primary cut-outs whether they are of circular shape or the polygonal shape illustrated by FIGS. 15 and 16, and particularly if the leading hook shaped end 40 of said teeth are twisted or set at a sufficient angle to the plane of the rest of the tooth.

Figure 6:
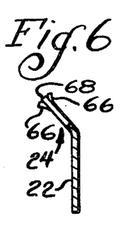
FIG. 6 illustrates a second embodiment of the invention wherein the working edge comprising the teeth of the blade are set at an angle to the blade body.
Figure 7:
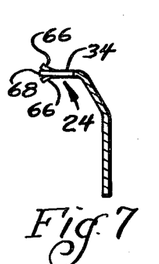
FIG. 7 illustrates a variation of the embodiment illustrated in FIG. 6 wherein the teeth lie generally in a cylindrical plane normal to the plane of the blade body.

As thus far described, teeth 34 comprising the portions of the outer working edge 24 left between the primary cut-outs 30 are disposed generally in the plane of the main body 22 of the blade or segment 20. It will be understood, however, that the invention is also applicable to blades having an outer working edge 24 inclined at some angle to the main body, for example as illustrated by FIGS. 6 and 7 of the drawings. In FIG. 6 the plane of the teeth 34 comprising the outer working edge of the blade is inclined at roughly 30° to the plane of the main body of the blades and in FIG. 7 the plane of the teeth is disposed at 90° to the plane of the blade body. As more particularly explained in W. E. Jensen U.S. Pat. No. 3,618,187 supra, such inclination of the working edge of the blades is particularly useful when the mounting hub also is so disposed that the inclined or axially disposed teeth engage the tire T immediately ahead of the plane indicated by y—y which includes the axis on which the tire is centered. In this circumstance disposition of the teeth is particularly effective in cutting material from the tire carcass periphery in large chunks as opposed to the more normal abrading, scraping or mutilating action which characterizes the action of the radially disposed teeth. In FIG. 1, the first row B' of the blades on the left hand side, and remote from the motor M, have their teeth 34 set at an angle of approximately 30° (as illustrated by FIG. 6). The ramaining rows of blades which follow said first row, considering the direction of rotation of the tire carcass as illustrated by the arrow K, have their teeth generally in the plane of the main body 22, therefore extending generally radially of hub R and also slightly beyond the radial extent of the teeth in the first row. Thus the teeth of the first row of blades effectively cut the rubber from the tire carcass in large chips and chunks while the succeeding rows of blades effectively rasp or abrade the remaining surface to further reduce it and to the required buffing texture as more particularly explained in said U.S. Pat. No. 3,618,187. In the case of blades having their teeth set at an angle so as to be axially directed of the hub, as illustrated by FIGS. 6 and 7, it has been found particularly useful to set portions 66, 66 of the tooth outer edge as illustrated by FIG. 10. The illustrated setting of the teeth outer edge has been found particularly effective in facilitating the cutting action of the primary cutting edges of the blade teeth penetrating deeply into the tire carcass surface.

Figure 19:
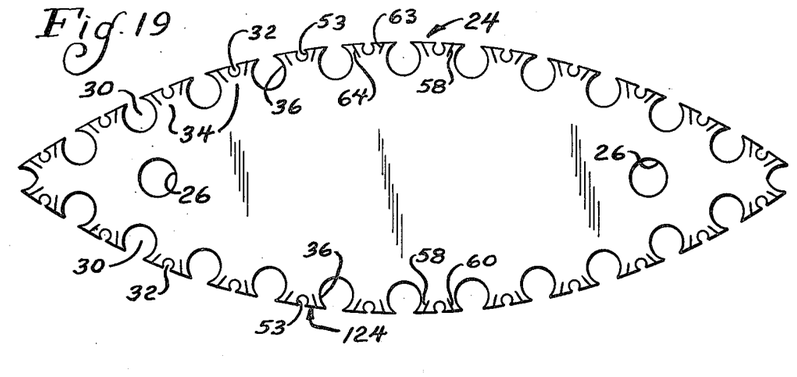
FIG. 19 shows a blade according to the present invention having two complex shaped working edges.

As thus far discussed, the working edge of the described blades have been considered as comprising the convex outer edge of angular shaped segments having a generally convexo-concave shape as illustrated by FIG. 3. FIG. 19, however, illustrates a variation thereof within the blades have two convex outer working edges, both of which may have teeth comprising primary or rough cutting edges 36, secondary or fine cutting edges 53 and tertiary or buffing edges 63 or 64 as in the case of the above described embodiments of the invention. However, only one of said working edges at a time is exposed beyond the periphery of the hub when assembled between plates RT and RP thereof, the other working edge being located within the hub. When the teeth of the working edge 24, including their primary and fine cutting edges and tertiary or buffing edges have become worn, the blades may be removed and reinserted with their second working edge 124 in the exposed position location of their first working edge 24, thus significantly increasing the lift of the blade. It will also be understood that in the blades as thus far described, whether the shape illustrated by FIG. 3 or of the shape illustrated by FIG. 19, each tooth has both a leading and a trailing primary cutting edge, a secondary cut-out, and one or more slots providing a tertiary buffing edge or edges. It will be understood, however, that in the usual tread removing action of the blades, it is only one of each said primary cutting edges, secondary fine cutting edges and tertiary buffing edges of the respective secondary and primary cut-outs and slots that are actually attacking the tire tread and, therefore, subject to wear. The other edges are performing primarily a revitalizing function. However, these other edges are similarly shaped as the working edges, and as the first group of edges wear the blades may be reversed so that the second group take the place of the original working edges. Thus the primary trailing edge of each tooth becomes the leading primary tooth edge, the leading edge of the secondary edge now becomes the secondary fine cutting edge and the leading edges of the slots 58, 60 become the effective buffing edges. Wherefore, the life of the blades is lengthened and the general utility increased.

Figure 22:
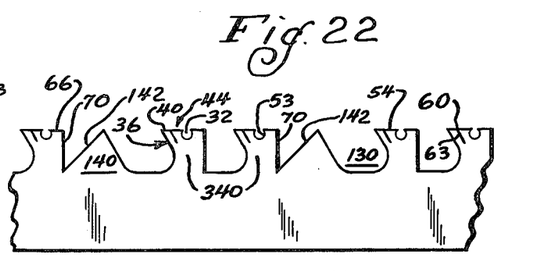
FIGS. 22 and 23 illustrate a further variation of blade in accordance with the invention, FIG. 22 being a side view and FIG. 23 an edge view thereof.
Figure 23:
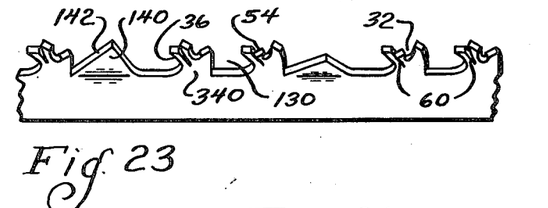

Although as thus far described it has been considered that all of the teeth of the blades have the shape and characteristic of teeth 34, whether defined by polygonal or circular shaped primary or secondary cut-outs, it is further contemplated within the broader aspects of the invention that all of the teeth of the blade or blades mounted in a rasp hub need not be of the same shape, but may have teeth of other shape or shapes interspersed therewith to serve specific purposes. For example, FIGS. 22 and 23 illustrate a further embodiment of the invention wherein most but not all of the teeth 340 have a primary leading cutting edge corresponding to 36 and which define an acutely sharp hooked end 40 set at a positive rake or included angle of less than 60° with the outer edge 44 of said teeth. Said outer edge 44 of said teeth 340 contains both a secondary cut-out 32 providing a secondary cutting edge at 53 with a similar acutely sharpened hook end 56 as aforedescribed. Said outer edge 44 further has a tertiary buffing edge 63 constituted by a forwardly inclined slot or slit 60 disposed between primary edge 36 and secondary cut-out 32. The trailing primary edge 70 of teeth 340, howevere, is not hook-shaped but more nearly radial. The blade of FIGS. 22 and 23 is therefore not reversible. Also, teeth 340 of said illustrated blade do not contain a second slot 58 with a corresponding tertiary buffing edge 64 of negative rake. However, randomly interspersed among teeth 340 are other teeth 140 having outwardly converging edges 142 affording thereto an inverted V-shape and these teeth are laterally offset from the plane of teeth 340 as seen in FIG. 23, said offset being to the opposite side to which edge portion 66 of the teeth 340 are shown as set. By reason of the V-shape of said teeth 140, their leading edge 142 has a negative rake, therefore, at least to some extent said teeth 140 are capable of providing a buffing function corresponding to that of the tertiary edge 64 of teeth 34. In the embodiment illustrated by FIGS. 22, 23 the primary cut-out 130 which separates teeth 340 from the immediately proceeding teeth is circular, at least the portion thereof on its trailing side which defines the leading edge of the tooth 340. Although said cut-outs 130 are not fully circular as in the case of the FIG. 3 embodiment, or polygonal as in the case of the embodiment according to FIGS. 15 and 16, nevertheless, said primary cut-outs 130 are relatively large and have a relatively wide mouth 350 to facilitate deep penetration of the teeth into the tire carcass peripheral surface as the rasp is brought into engagement therewith. Therefore, blades of FIGS. 22 and 23 are useful in accordance with the invention, although the first described blades, as illustrated by FIG. 8 are to be preferred.

Figure 20:
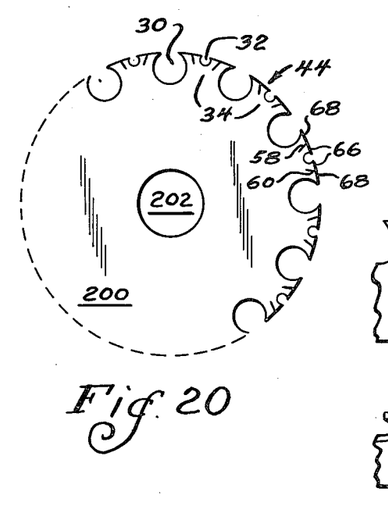
FIGS. 20 and 21 illustrate blades according to the present invention which have a 360° working edge, FIG. 20 illustrating the blades as a disc
Figure 21:
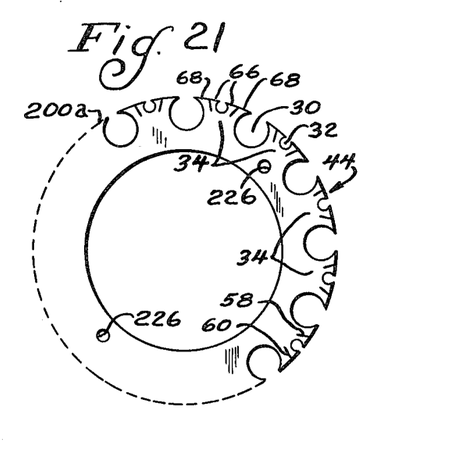
Figure 24:
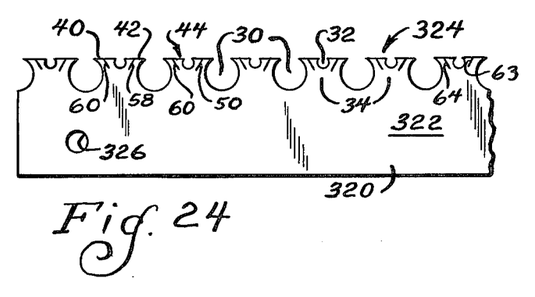
FIG. 24 shows a blade according to the present invention wherein the working edge is non-arcuate.

FIGS. 20 and 21 illustrate further forms of blades embodying the invention wherein the blades comprise not segments of circles, but full circles, either a disc 200 as shown in FIG. 20, or an annulus 200a as shown in FIG. 21. Said discs and annuli as illustrated have teeth 34 defined by intervening primary cut-outs according to the present invention and these teeth extend throughout the full 360° of the circular periphery of said disc or annulus. Each said teeth also have their outer edge 44 interrupted by a circular cut-out 32 and have intermediately disposed converging slots 58, 60. Portions 66, 66 and 68, 68 into which the outer edge of the teeth are thus divided have a set as above described in connection with FIG. 4 to expose the trailing edge of said slots to perform their buffing function. They also can have a set as illustrated in any of FIGS. 9 through 14. Discs 200 as illustrated in FIG. 20 are provided with a central aperture 202 of a diameter to receive shaft S as when assembled between the mounting plates of a hub such as illustrated in FIG. 1. Annuli 200a, by their nature, have a much larger opening. Annulus 200a is also illustrated provided with spaced openings 226 to receive the mounting pins of suitably equipped hubs. Discs 200, as illustrated, however, does not have such openings and is simply clamped between pinless hub plates otherwise corresponding to plates RP and RT. Referring next to FIG. 24, there is illustrated a still further form of blade 320 to which the invention is also adapted. In this form of blade, the blade comprises an essentially flat main body 322 having a working edge 324 on one or both of its longitudinal edges which correspond generally to the working edge 24 of the blades previously described. In this instance working edge 324, however, is not arcuate, but straight. Said working edge 324 is illustrated in FIG. 24 as having spaced teeth 34 separated by large primary cut-outs 30; arranged substantially as shown and described in connection with the previously described embodiments of the invention. Thus the outer edge 44 of each said teeth have secondary cut-outs 32 intermediate the teeth defining primary cut-outs 30. Said outer edge 44 of the teeth further have slots 58, 60 to either side of the secondary cut-outs 32 therebetween and the leading and trailing prongs 40 and 42 of the teeth. As aforementioned the trailing edges of said slots provide tertiary buffing edges 63, 64. These tertiary buffing edges 63, 64 cooperate with the primary cutting edge 36 and secondary fine cutting edge 53 in reducing the tire carcass peripheral surface to the required shape, size and buffing texture.

Figures 25, 26, 27, 28, 29:
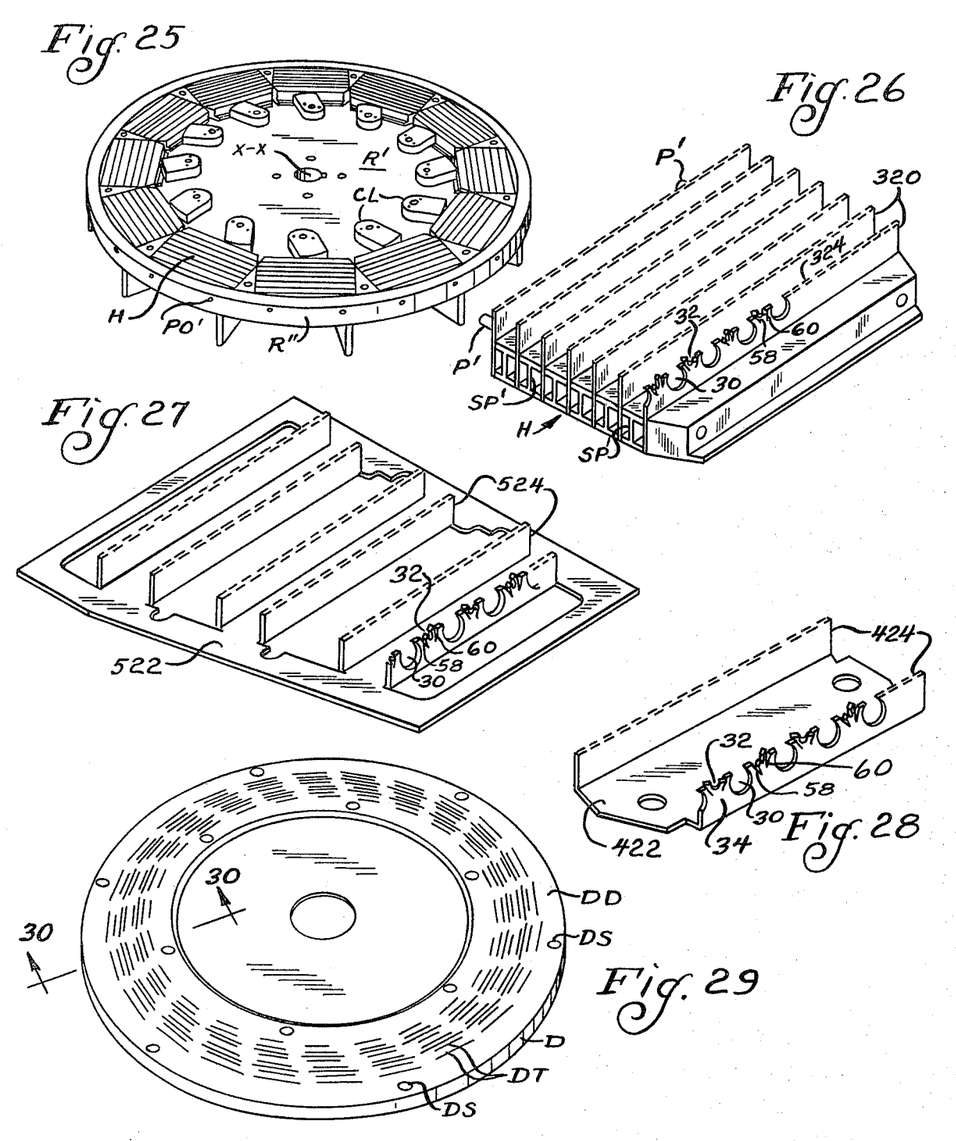
FIG. 25 illustrates a disc type hub for a tire buffing machine in which blades of the present invention as illustrated by FIG. 24 are mounted.
FIG. 26 illustrates one of the blade assembly and spacer means used in the disc type hub of FIG. 25.
FIGS. 27 and 28 illustrate still further forms of blades for tire buffing machines in accordance with the invention.
FIG. 29 illustrates an assembly of the blades of FIGS. 27 and 28 mounted in a disc type blade housing for a tire buffing machine.

The blade of FIG. 24 is particularly useful for mounting in a hub such as illustrated by FIG. 25. For this purpose, such blades 320 have spaced openings 326 in their main body 322, one of which is shown in FIG. 24. These openings 326 are spaced at a constant distance from the working edge 324 of the blade and provide means by which the blades are mounted on pins P' of a mounting unit H illustrated in FIG. 26. At SP' are spacer elements also apertured for mounting on pins P' and these are arranged between the blades to separate them into rows of desired configuration. As illustrated in FIG. 25, several such units H each with an assembly of such blades and spacers are located on the exposed side of a centrally apertured disc R'. Said disc R' has a peripherally exposed ridge R'' provided with appropriately spaced openings PO' which receive the exposed ends of pins P' of the respective units H and pivotally mounted cam locks CL serve to lock each said units H in place. As thus assembled, the teeth comprising the working edge 324 of said blades 320 extend upwardly above ridge R'', axially of hub R', and generally tangentially to the hub axis. In this form of hub it will be understood that axis $x$—$x$ on which the hub R', and therefore the working edge 324 of the blades rotate, essentially coincides with axis $y$—$y$ rather than being at right angles thereto as illustrated in FIG. 1.

Figure 30:
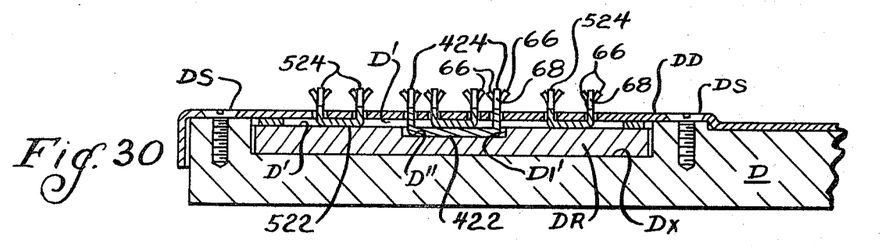
FIG. 30 is a sectional view taken along lines 30—30 in FIG. 29 and illustrates details of the blade mounting structure.

FIGS. 27 and 28 illustrate still further forms of blades to which the invention is applicable. Such blades are adapted for assembly in a disc hub as illustrated in FIGS. 29 and 30. In said FIGS. 29 and 30 the disc hub comprises a first disc member D having a centrally disposed shaft receiving aperture and a second disc DD which is mounted over and secured to the outer periphery of the first disc D as by screws DS. As illustrated in FIG. 30, disc member D has a peripherally disposed annular recess Dx in which is received a ring DR. Said ring DR has a first peripherally disposed annular blade receiving recess D' and a concentric secondary annular blade receiving recess D''. Recess D' provides means in which the body of blades of FIG. 27 may be assembled and recess D'' provides means in which the body of blades illustrated in FIG. 28 are assembled. Considering FIG. 30 with FIG. 29 it will be seen that the outer disc DD is provided with a plurality of appropriately spaced slots DT. In FIG. 29 said slots are arranged in groups of eight and are disposed tangential to the central aperture of said disc hub.

Referring now more particularly to FIGS. 27 and 28, the blades illustated by FIG. 28 have a main body 422 and upstanding outer working edges 424 which are disposed normal to the main body 422 and in spaced parallel relation to each other. The blades of FIG. 27 also have a main body 522 that is also essentially flat and with parallel surfaces. The latter, however, has several parallel spaced upstanding working edges 524 which in the illustrated example are six in number. The working edge 424 of the FIG. 28 blade and the working edge 524 of the FIG. 27 blades are normally disposed to their supporting body 422 or 522 and in spaced parallel relation to each other. The working edges 524 and 424 of the respective blades have teeth 34 defined by spaced primary cut-outs 30, and secondary cut-outs 32 and inclined slots 58, 60 in their outer edge as above discussed in connection with FIG. 24. Unlike the embodiment illustrated by FIG. 28, the working edges 524 of the blade of FIG. 27 are not the outer edge of the blade body, but are cut from and bent upwardly out of the material of the main body at spaced intervals inwardly of their opposed side edges. As illustrated in FIG. 30, the two blades are assembled together and assembled in ring DR with blade body 522 seating in recess D' and its spaced upstanding working edge 524 protruding through the appropriately located slots DT and outer disc DD. Recess D'' provides a seat for body 422 of blade 420 below body 522 and its two upstanding working edges 424 protrude upwardly through the vacated spaces in body 522 of blades 520 and out through slots DT of the outer disc DD. As aforedescribed, outer disc DD is secured to disc D as by screws DS to complete the assembly. In other respects the hub represented by FIG. 29 when assembled with blades of FIGS. 27 and 28 similarly function as does the hub illustrated by FIG. 25.

Figures 31, 32, 34:
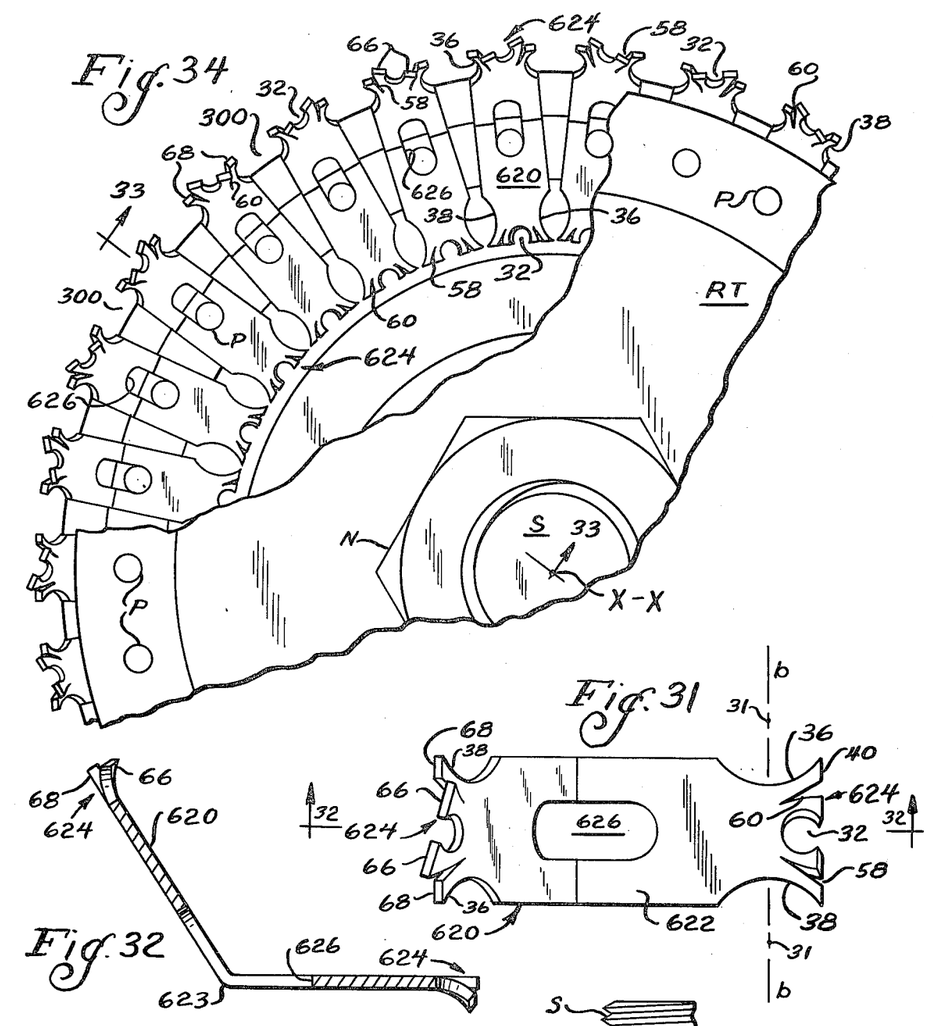

FIGS. 31 and 32 illustrate a still further form of blade embodying the invention. In FIG. 31, blade 620 comprises a generally rectangular shaped main body 622 having a working edge 624 along each of its two opposed ends. Each said working edges 624 comprises a single tooth having a leading semi-circular shaped primary cutting edge 36 and a trailing primary edge 38 also of semi-circular shape. The outer edge 44 of said tooth of each working edge 624 has a secondary cut-out 32 and a pair of inwardly converging slots 60 and 58 disposed midway between said circular cut-out 32 and the hooked ends 40, 42 which said leading and trailing primary cutting edges define with the outer edge 44 of said teeth. Said slots 58, 60 are inclined inwardly in converging relation and both said slots 60, 58 and circular cut-outs 32 extend to a depth less than center line $b$—$b$ along which the centers of the circular shaped primary and trailing cutting edges 36 and 38 are defined. Thus the single tooth 34 comprising each of the outer working edges 624 of the blade have a construction generally similar to the teeth 34 of the FIG. 8 embodiment of the invention above described. In the embodiment illustrated by FIG. 31 portions 66, 66 of the outer edge of said teeth between the slots 58, 60 and the circular cut-out 32 are set at an angle to the plane of portions 68, 68 which are retained in the plane of the tooth. However, outer edge portion of said teeth may be given other sets so as to expose their buffing and secondary cutting edges, for example a set such as aforedescribed in connection with FIGS. 4 and 9 through 14. It will also be understood that the leading and trailing primary cutting edges of said teeth may have a shape such as for example illustrated in FIGS. 15, 16 and 17.

Figure 33:
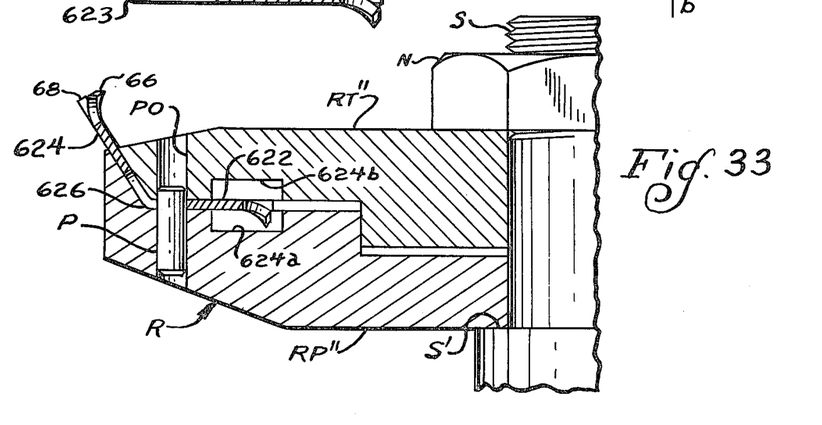

As illustrated in FIG. 33, blades 620 are arranged in circumferentially spaced relation between a pair of suitably shaped hub plates RP'' and RT'' such that one of their two working edges is exposed outwardly of the hub assembly and the other working edge is concealed between said plates. As illustrated in FIG. 32, the body portion 622 of said blades 620 is bent longitudinally at 623, as for example at 60°, such that when assembled with other blades between plates RT'' and RP'' their working edges together will comprise a frusto-cone centered on axis $x$—$x$ (FIG. 34) about which the hub assembly rotates and which frusto-cone comprises a plurality of equi-spaced teeth separated by relatively large generally circular shaped openings 300. For convenience in assembling the blades, body 622 of each blade has an elongated slot or opening 626 which receives a pin P mounted in hub plate RP'' at appropriate intervals. The length of opening 626 is such that either working edge may be disposed outwardly of the peripheral edge of the hub when assembled therewith and with pin P engaging the rear or inward edge of said opening or slot 26. As illustrated in FIG. 33, both hub plate RP'' and hub plate RT'' are suitably recessed at 624a and 624b respectively, to accommodate the set of the outer tooth edge of the working edge of the blade which is located between the two hub plates.

Figure 35:
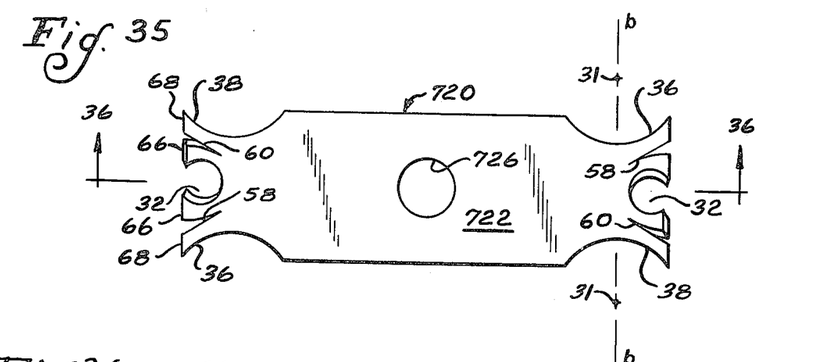
FIG. 35 illustrates still another form of blade incorporating the invention.
Figure 36:
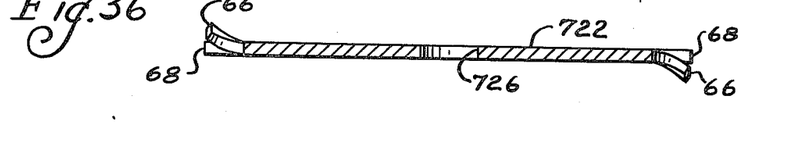
FIG. 36 is a longitudinal sectional view taken through said blade along lines 36—36 of said FIG. 35.
Figure 37:
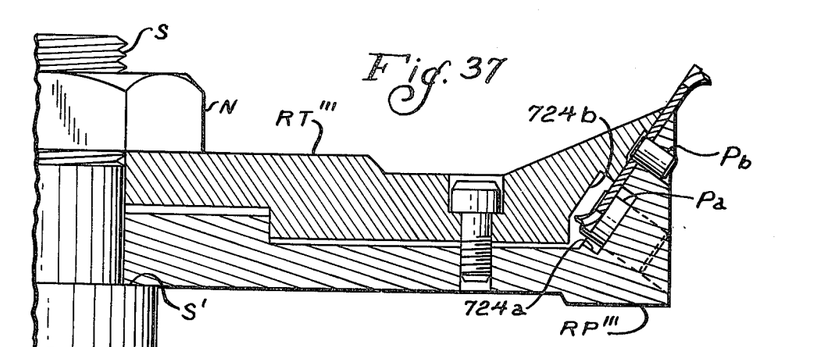
Figure 38:
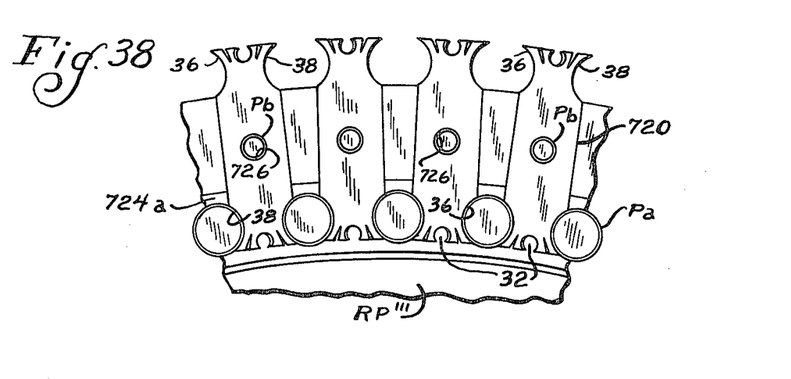

FIGS. 35 and 36 illustrates a variation of the blade of FIG. 31 wherein the blade is not bent, but straight. In other respects blade 720 of FIG. 35 corresponds to blade 620 of FIG. 31 as above described. As illustrated in FIGS. 37 and 38, mounting plate RP''' is provided with a pair of pins Pa Pb, the former being of larger diameter than pin Pb. Referring to FIG. 35, it will be seen that body 722 of blade 720 has an opening 726 dimensioned to receive pin Pb. Pins Pa of larger diameter as shown in FIG. 38 are offset from the arrangement of pins Pb and each is dimensioned and located so as to engage the adjacent leading and trailing primary edges 36 and 38 of the teeth comprising the working edge of the adjacent blades when thus assembled between hub plates RP''' and RT'''. By reason of their relationship, said pins serve to resist both lateral and longitudinal movement of the blades and so that they retain the relationship illustrated while at the same time unaffecting the set of the teeth. Furthermore, the two hub plates are suitably recessed at 724a and 724b to provide clearance for the set of the inwardly located working edge of the blades.

As thus described, it will be seen that the invention is capable of achieving all of the objects, advantages and features recited therefor and in a highly practical and economical manner. Furthermore, it will be seen that the invention has application to a wide variety of blades, both those intended for mounting in hubs of the cylindrical and those for mounting in hubs of the disc type. An example of the former is exemplified by FIGS. 3–20 of the drawing and of the latter by FIGS. 6, 7, 31 and 35 of said drawings. In all instances the blades are characterized as comprising integral members stamped from sheet metal so as to have an essentially flat main body with one or more working edges and which edges may comprise one or more teeth lying either in the general plane of the main body or inclined thereto. All said blades when properly mounted in the hub for which they are intended have a working edge capable of being brought into attack on the periphery of the tire carcass with rotation of the hub to deeply penetrate and rough cut the periphery of the tire carcass to a required pattern and shape, simultaneously fine cut and buff said rough cut surface to a texture to which the subsequently applied rubber or other tread containing material will strongly bond when vulcanized thereto.

It will be further appreciated that the above description and examples are to be considered merely exemplary forms which the invention may take, the scope and protection afforded by the patent being represented by the claims hereto appended. Therefore, it is to be understood that many variations, as well as rearrangement of the described cutting edges and buffing edges, as well as their disposition and number may be had and are intended to be included within the scope of the claims as presented below.

Thus having described the invention, we claim:

1. A replaceable blade for the rotating hub of a tire tread removing machine comprising a main body portion adapted for mounting on said hub and a working edge portion, said working edge portion comprising one or more teeth, said teeth having a leading relatively deep primary cutting edge of positive rake, and an outer edge, said outer tooth edge being interrupted by a cut-out presenting a shallower secondary cutting edge of positive rake spaced behind said primary cutting edge, said outer tooth edge further containing a tertiary buffing edge defined by the trailing edge of a slot disposed between said primary and secondary cutting edges.

2. The blade of claim 1 wherein the main body portion is generally planar and the working edge portion comprises a flange portion extending longitudinally of and angled to the main body portion.

3. The blade of claim 1 wherein said teeth have a further buffing edge of negative rake behind the secondary cutting edge.

4. The blade of claim 3 wherein the further buffing edge of said teeth lie in a plane including the leading primary cutting edge of said teeth.

5. The blade of claim 1 wherein the tertiary buffing edge is laterally offset from the leading primary cutting edge.

6. The blade of claim 5 wherein the secondary cutting edge is offset laterally to the opposite side of said plane including the primary cutting edge.

7. The blade of claim 3 wherein the secondary cutting edge and tertiary buffing edge of each tooth define a minor plane transversely angled to a major plane including the leading primary cutting edge and further buffing edge.

8. The blade of claim 7 wherein said minor plane of each tooth is oppositely set to the minor plane of the next succeeding tooth.

9. The blade of claim 1 wherein the tertiary buffing edge and secondary cutting edge lie in a common plane.

10. The blade of claim 9 wherein said teeth have a further buffing edge behind the secondary cutting edge and offset laterally therefrom.

11. The blade of claim 10 wherein the further buffing edge and leading primary cutting edge of said teeth lie to the same side of said common plane.

12. The blade of claim 11 wherein the further buffing edge and primary cutting edge of alternate teeth are disposed to opposite sides of said common plane.

13. A replaceable blade for the rotating hub of a tire tread removing machine comprising a sheet metal member having a convex-shaped outer working edge and means spaced inwardly of said working edge for mounting the blade on said hub, said working edge embodying spaced teeth at least some of which have radially deep outwardly diverging leading and trailing side edges and an interrupted outer edge with terminal portions which form sharp prongs with the outer termini of said side edges, said outer edge between said sharp prongs having an interrupting cut-out with radially shallower leading and trailing edges in outwardly converging relation, said outer edge having at least one indentation therein between said cut-out and said sharp prongs, the portin of said outer edge between the indentation and cut-out being laterally offset from other portions of said outer edge on either side thereof.

14. A blade as claimed in claim 13 wherein said outer edge of the teeth have a non-radially inclined narrow slot on each side of the cut-out therebetween and the sharp prongs.

15. A blade as claimed in claim 14 wherein said narrow slots are in outwardly diverging relation.

16. A blade as claimed in claim 15 wherein portions of the outer tooth edge defined between the primary prongs and the narrow slots are twisted laterally of the tooth.

17. A blade as claimed in claim 15 wherein said portions of said outer edge defined between the cut-out and narrow slots are twisted laterally of the tooth.

18. A blade as claimed in claim 17 wherein said laterally twisted portions of the outer tooth edge defined by the cut-out and narrow slots are to opposite sides of the tooth.

19. A blade as claimed in claim 18 wherein said portions of the outer edge of alternate teeth are oppositely twisted to corresponding portions of the succeeding tooth.

20. A blade as claimed in claim 17 wherein said laterally twisted portions of the outer tooth edge are to the same side of the tooth and at an angle to each other.

21. A blade as claimed in claim 13 wherein said outer tooth edge has a pair of indentations, one between the cut-out and each said sharp prongs, the prongs being oppositely twisted and to the same side of the tooth.

22. A blade as claimed in claim 21 wherein the prongs of alternate teeth lie to the opposite side to which the prongs of the intervening teeth are displaced.

23. A replaceable blade for the rotating hub of a tire tread removing machine comprising a sheet metal member having a working edge including a plurality of widely spaced and radially deep teeth each having outwardly diverging leading and trailing side edges and an interrupted outer edge, the opposed terminal portions of which outer tooth edge form acutely sharp primary prongs with the respective leading and trailing side edge of the teeth, said outer tooth edge further including a cut-out with outwardly converging lead and trail edges having a depth less than that of the tooth and which lead and trail edges form acutely sharp secondary prongs with portions of the tooth outer edge on either side of the cut-out, at least one of the portions of said outer tooth edge further having a slot between the adjacent primary prongs and the cut-out, the edges of said slots being inclined to said outer tooth edge and laterally offset from each other.

24. A replaceable blade as claimed in claim 23 wherein the blade comprises an annular section having a body portion adapted for mounting on the rotating hub of a tire buffing machine and an integral frusto-conical outer section extending longitudinally of said body portion which contains said working edge.

25. A replaceable tire rasp blade comprising a sheet metal member having an outer working edge of generally convex arcuate shape which includes a plurality of outwardly projecting generally dove-tail shaped teeth, at least some of which have an interrupted outer edge and opposed concave-shaped leading and trailing side edges, said leading and trailing side edges diverging inwardly adjacent the root of the tooth to afford a broad base for the tooth and diverging outwardly adjacent the outer tooth edge to form with said outer tooth edge oppositely directed sharp primary prongs, said outer tooth edge being interrupted by a circular shaped cut-out having a mouth less than its diameter, opposed side edges of said cut-out adjacent said mouth converging outwardly to form sharp secondary prongs with said outer tooth edge spaced between said primary prongs, the diameter of said circular cut-out being less than the depth and height of the tooth, and inwardly diverging narrow slots interrupting said outer tooth edge, one on each side of the side edges of each said slots being disposed laterally of said primary prongs.

26. A tire rasp blade as claimed in claim 25 wherein portions of the outer tooth edge containing the edge of said slots toward the primary prongs are offset from said primary prongs.

27. A tire rasp blade as claimed in claim 26 wherein the respective edges of said slots directed toward the primary prongs are offset to the same side of the tooth.

28. A tire rasp blade as claimed in claim 26 wherein one of the portions of the outer tooth edge containing the edge of one slot is offset to one side of the tooth and the portion of the tooth outer edge containing the edge of the other slot is offset to the opposite side of the tooth.

29. A tire rasp blade as claimed in claim 27 wherein the edge of said slots toward the primary prongs are offset to the same side of the teeth and in every other tooth said offset is reversed.

30. A tire rasp blade as claimed in claim 28 wherein the portions of the outer tooth edge containing the edges of the slots toward the primary prongs are disposed transversely to the primary prongs.

31. A tire rasp blade as claimed in claim 30 wherein in some of the teeth in line of the portions of the outer tooth edge containing the edges of the slotss directed toward the primary prongs is set at an angle to the line of the corresponding portions of the outer tooth edge of the other teeth.

32. A replaceable blade for the rotating hub of a tire detreading machine comprising a sheet metal member having an interrupted working edge and a main body portion adapted for mounting to said hub to locate the blade on said hub, said working edge comprising spaced relatively deep primary cut-outs, the trailing edge of at least some of which constitute hook-shaped primary cutting edges interrupting the working edge at a sharp angle, said working edge being interrupted by other cut-outs of shallower depth interspaced between said relatively deep primary cut-outs, at least some of said shallower cut-outs having their trailing edge also of hook-shape and constituting secondary cutting edges sharply intersecting said working edge, and further of said shallower cut-outs having their trailing edge intersecting said working edge at a more blunted angle to said working edge.

33. A replaceable blade according to claim 32 wherein said working edge comprises a flanged portion angled to the main body portion of the blade.

34. A replaceable blade according to claim 32 wherein the further of said shallower cut-outs are slots arranged in inwardly converging relation and on opposite sides of the shallower cut-outs therebetween and the primary relatively deep cut-outs.

35. A replaceable blade according to claim 32 wherein said primary and secondary cutting edges and buffing edges are arranged in an opened spaced relation.

36. A replaceable blade for the rotating hub of a tire tread removing machine comprising a sheet metal member having a working edge along at least one end, including at least one relatively deep tooth, said tooth having outwardly diverging leading and trailing side edges and an interrupted outer edge, the opposed terminal portions of which outer tooth edge form acutely sharp primary prongs with the respective leading and trailing side edge of the tooth, said outer tooth edge further including a cut-out with outwardly converging lead and trail edges having a depth less than that of the tooth and which lead and trail edges form acutely sharp secondary prongs with portions of the tooth outer edge on either side of the cut-out, at least one of the portions of said outer tooth edge further having a slot between the adjacent primary prong and the cut-out, the edges of said slot being inclined to said outer tooth edge.

37. A replaceable blade as claimed in claim 36 wherein the blade comprises a segment having a body portion adapted for mounting on the rotating hub of a tire buffing machine with like segments so as to expose their outer working edge beyond the periphery of the rotating hub and in a circular form thereabout.

38. A replaceable blade as claimed in claim 37 wherein the blade has a second tooth corresponding to said one tooth and on the opposite end of its said body portion to that including the one tooth.

39. A replaceable blade as claimed in claim 37 wherein said working edge lies generally in a plane at an angle to the plane of the body portion.

* * * * *

UNITED STATES PATENT OFFICE
CERTIFICATE OF CORRECTION

PATENT NO. : 3,879,825
DATED : April 29, 1975
INVENTOR(S) : Wayne E. Jensen & Charles Keith Stanfield It is certified that error appears in the above-identified patent and that said Letters Patent are hereby corrected as shown below:

Column 19 line 45

After "side of" insert

--said circular cut-out therebetween and a primary prong, one of --

Signed and sealed this 15th day of July 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
SECOND CERTIFICATE OF CORRECTION

PATENT NO. : 3879825
DATED : April 29, 1975
INVENTOR(S) : Wayne E. Jensen and Charles Keith Stanfield It is certified that error appears in the above-identified patent and that said Letters Patent are hereby corrected as shown below:

Column 4, line 47 Change "complex" to -- convex --;

Column 4, line 50 Change "is" to -- as an --.

Column 8, line 52 to 53 Cancel "interrupt the outer tooth edge 44 on one or both sides of the';

Column 8, line 54 After "interrupt" insert -- the outer edge 44 on one or both sides of --

Signed and Sealed this sixteenth Day of March 1976

[SEAL]

Attest:

RUTH C. MASON
Attesting Officer

C. MARSHALL DANN
Commissioner of Patents and Trademarks